United States Patent [19]

Thomas et al.

[11] Patent Number: 4,513,771

[45] Date of Patent: Apr. 30, 1985

[54] AIR VALVE

[75] Inventors: Michael J. Thomas; David B. McDonald, both of Lockport, N.Y.

[73] Assignee: General Motors Corporation, Detroit, Mich.

[21] Appl. No.: 548,926

[22] Filed: Nov. 7, 1983

[51] Int. Cl.³ .............................................. F16K 1/22
[52] U.S. Cl. .................................. 137/315; 251/292; 251/308
[58] Field of Search .............. 251/308, 305, 306, 307, 251/291, 292; 384/439, 441, 125; 137/315

[56] References Cited

U.S. PATENT DOCUMENTS

| | | | |
|---|---|---|---|
| 234,366 | 11/1880 | Winchell | 251/308 |
| 2,884,283 | 4/1959 | Korol et al. | 384/439 |
| 3,503,586 | 3/1970 | Bordes | 251/291 |
| 4,325,536 | 4/1982 | Garrett | 251/308 |

*Primary Examiner*—Martin P. Schwadron
*Assistant Examiner*—James R. Shay
*Attorney, Agent, or Firm*—R. L. Phillips

[57] ABSTRACT

An air valve is disclosed having a valve plate with a snap-in lever-bearing at one end and a similar lever-bearing at the opposite end or optionally a snap-in bearing without a lever at the latter end.

4 Claims, 8 Drawing Figures

AIR VALVE

This invention relates to air valves and more particularly to the assembly and mounting thereof.

The typical air valve used in vehicle air conditioning, heating and defrosting systems and the like comprises a plate that is secured to a metal shaft by the formation of the latter with a special shape such as a D-shaped cross-section that keys into similarly shaped loops formed in the plate. The shaft extends through and rests in holes in the opposite sides of the air duct so as to be pivotally supported thereby. And depending on the use of the air valve, a lever is welded to one or both ends of the shaft. While such an arrangement has proven generally satisfactory, the fit of the shaft in its mounting holes in the air duct must be closely controlled to minimize air leakage and the manner of assembly and installation in remote areas can be difficult. Furthermore, there is the continuing goal to reduce weight and cost.

The air valve of the present invention is a substantial improvement in all such concerned respects by the formation of two simple plastic components to replace the specially shaped metal shaft and welded lever assembly. In lieu of the shaft, there is provided a snap-in plastic lever-bearing at one end of the air valve and a similar lever-bearing at the opposite end or optionally a plastic snap-in bearing without a lever at the latter end. The air valve which may be either metal or plastic is simply formed so as to be engaged by and retain the plastic bearing parts.

Assembly is simplified by the present invention in that in the case where two levers are required, the valve plate is first positioned in the air duct and then the lever-bearing components are inserted through the holes in the air duct to engage the valve plate and snap-fit in place in the duct. On the other hand, in the case of a lever on one end and a bearing on the opposite end, the plain bearing component is first assembled to the valve plate and then inserted from within the air duct into one mounting hole and aligned with the opposite mounting hole and thereafter the lever-bearing component is snapped in place from external of the duct to retain the valve assembly. In each case it will be appreciated then that the secure fit of the bearings to the valve plate and air duct in addition to providing positive control level effort for various valve positions also assures a tight fit to prevent air leakage through the mounting holes in the duct. Furthermore, the assembly of the parts is quite simplified with the elimination of the specially shaped metal shaft and welded lever(s) while the assembly sequence allows installation of the valve in remote areas in the duct. In addition the connection of the lever-bearing component with the valve plate is such that they cannot be misassembled. Moreover, it will be appreciated that the improved design results in reduced weight and cost as compared with metal shaft and welded lever assembly.

These and other objects, advantages and features of the present invention will become more apparent from the following description and drawings in which.

Figure 1:
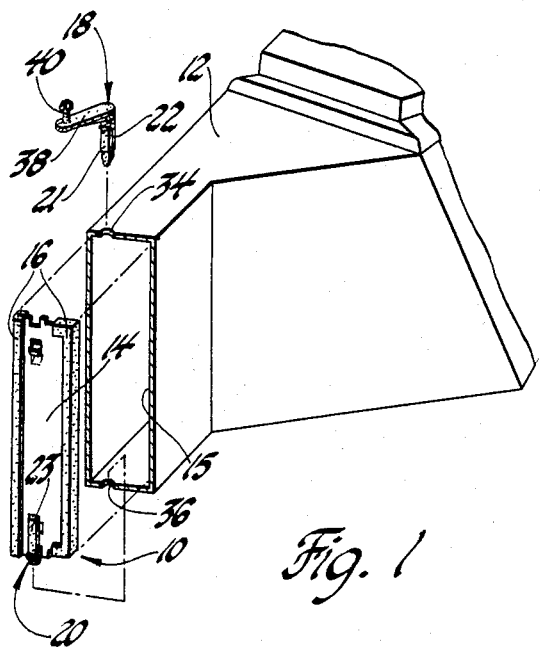
FIG. 1 is a partially exploded view of the one lever form of the air valve of the present invention as installed in an air duct.
Figure 2:
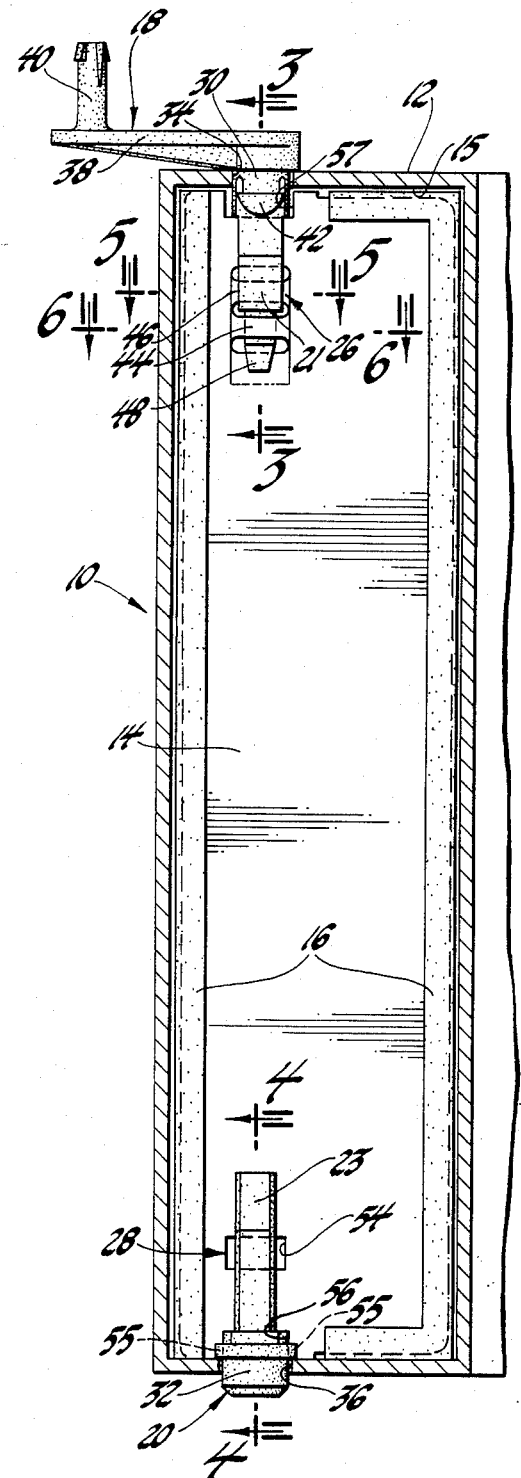
FIG. 2 is a cross-sectional view of the air valve in FIG. 1 assembled in the air duct.

Referring to FIGS. 1 and 2, there is shown an air valve generally designated as 10 adapted for use in an air duct 12 of a vehicle air conditioning, heating and defrosting system which apart from such air valve installation, is of conventional construction. The air valve 10 generally comprises a flat plate 14 of metal or plastic conforming in outline to that of the interior cross-section 15 at the place of installation in the air duct which in this case is of rectangular shape. The air valve is pivotally supported as will be described in more detail later so as to control the air flow through the duct and is provided with a seal arrangement 16 extending about its periphery so as to tightly close the duct when in the closed position The valve plate 14 is provided with both bearing support and a lever by two plastic components 18 and 20. The components 18 and 20 each have a pair of fingers 21, 22 and 23, 24 at one end respectively adapted to straddle the valve plate at opposite ends thereof so as to prevent relative rotation therebetween. In addition, the respective fingers 21, 22 and 23, 24 and the valve plate 14 have cooperating detent means generally designated as 26 (see FIG. 3) and 28 (see FIG. 4) respectively which operate to lock the components 18 and 20 in axial alignment on the valve plate as will be described in more detail later. Both the components 18 and 20 also have an integral bearing portion 30 and 32 of equal diameter adapted to be received and supported for rotary movement in aligned equal size support or mounting holes 34 and 36 in opposite sides of the duct to thereby support the air valve for pivotal movement therein.

Figure 3:
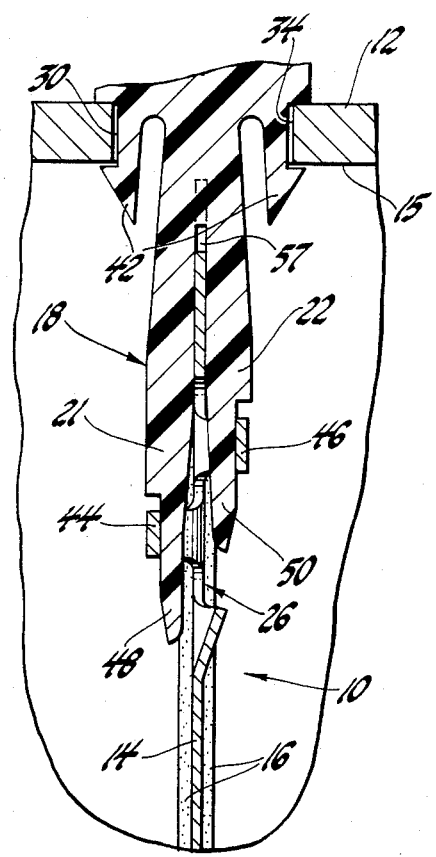
FIG. 3 is an enlarged view taken along the line 3—3 in FIG. 2.
Figure 7:
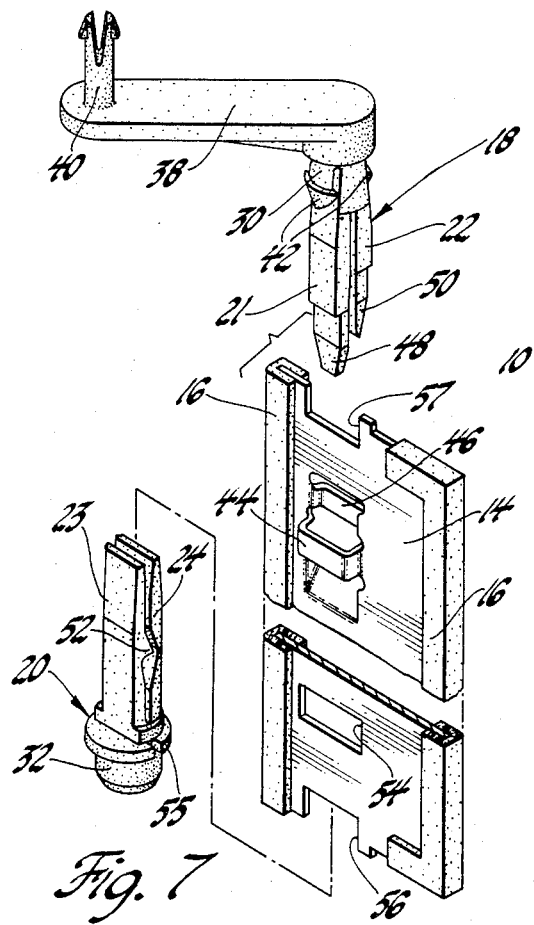
FIG. 7 is an enlarged exploded view of the air valve parts in FIGS. 1-6.

At least one of the support components, in this case the component 18, has a lever 38 integrally joined at one end to the outboard end of the component while the other end of the lever has a snap-fitting pivot pin 40 integrally joined thereto for connecting the lever and thereby the air valve in the control system (see FIGS. 2, 3 and 7). In addition, the lever-bearing component 18 is provided with snap-in means for retention in the duct in the form of a pair of prongs 42 intermediate its bearing portion 30 and fingers 21 and 22. The prongs 42 are cantilevered and formed with a hooked end so as to be deflectable and have a snap fit from external of the duct 12 into the support hole 34 to retain the bearing portion 30 there in place.

Figure 4:
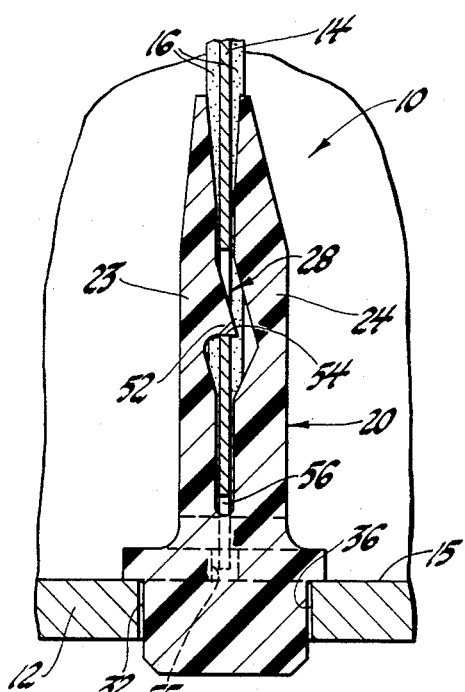
FIG. 4 is an enlarged view taken along the line 4—4 in FIG. 2.
Figure 5:
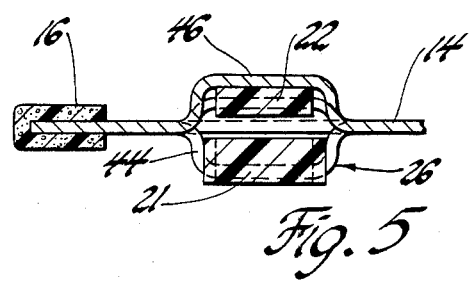
FIG. 5 is an enlarged view taken along the line 5—5 in FIG. 2.
Figure 6:
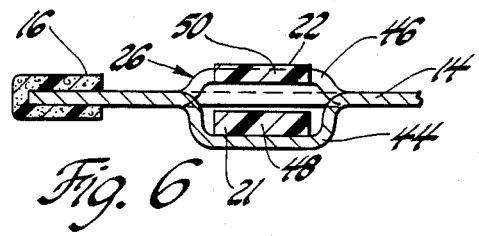
FIG. 6 is an enlarged view taken along the line 6—6 in FIG. 2.

The detent means 26 for the lever-bearing component 18 is formed by loops 44 and 46 integral with and extending from opposite sides of the valve plate 14 and by pointed and reduced sections 48 and 50 of the respective fingers 21 and 22 which engage the respective loops as best seen in FIGS. 2, 3, 5 and 6 so as to provide a good positive torque connection between the lever 38 and the valve plate 14 wherein they cannot be improperly assembled by reason of the loop and finger arrangement. On the other hand, the other valve support component 20 as best seen in FIGS. 2, 4 and 7 has no lever and its detent means 28 is simply provided by a tooth 52 on the one deflectable filter 23 that engages in a rectangular hole 54 in the valve plate while diametrically opposite slots 55 in the component key engage with the sides of an aligning notch 56 in the valve plate. And it is the hole 54 and notch 56 at the one end of the valve plate and the loops 44 and 46 together with an aligning notch 57 at the opposite end which cooperate with the respective components 20 and 18 to accurately align their bearing portions 32 and 30 for free pivotal movement in the respective mounting holes 36 and 34 in the air valve.

Figure 8:
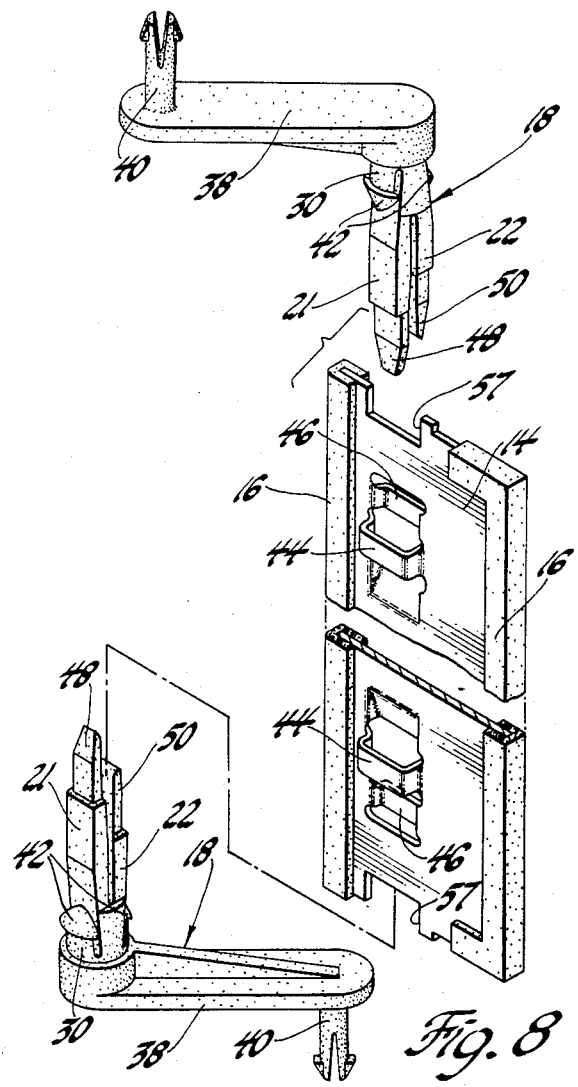
FIG. 8 is a view similar to FIG. 7 but showing the plain bearing component replaced by another lever-bearing component.

Describing the assembly of the air valve in the duct, the bearing component without the lever, i.e. component 20, is first assembled to the valve plate 14 as shown in FIG. 1 and then inserted from within the air duct into its mounting hole 36 in the duct and aligned with the opposite mounting hole. Thereafter, the lever-bearing component 18 is snapped in place in its mounting hole 34 from external of the duct to retain the valve assembly in place. On the other hand, where two levers are required for the air valve, the bearing component 20 may be replaced as shown in FIG. 8 by another lever-bearing component 18 and the valve plate adapted at this end to accommodate same as before. Moreover, the lever arms 38 of the two lever-bearing components 18 may be at the same angle or at different angles dependent upon the system requirements In this case, the valve plate is first positioned in the air duct and then both the lever-bearing components 18 are inserted through their respective mounting hole in the air duct to engage the valve plate and snap fit in place in the duct to retain the air valve assembly. A still further option is available in that where it is desired to fix a lever directly to the valve plate so that it is internal of the duct, the lever may then be omitted from the component 18 while retaining its snap-in feature for installation and retention of the valve plate as before.

The above described embodiments are illustrative of the invention which may be modified within the scope of the appended claims.

The embodiments of the invention in which an exclusive property or privilege is claimed are defined as follows:

1. An air valve adapted for installation in an air duct of a vehicle air conditioning, heating and defrosting system and the like characterized by a valve plate and a pivotal support and lever arrangement therefor comprising two separate support means each having a pair of fingers adapted to straddle said valve plate at opposite ends thereof, each said support means further having a bearing portion, said bearing portions adapted to be received in aligned support holes in said duct to thereby support said valve plate for pivotal movement therein, said valve plate and the fingers of both said support means having cooperating detent means for locking said support means on said valve plate so that said bearing portions are in axial alignment, at least one of said support means further having a lever, and snap-in means on said one support means intermediate its bearing portion and fingers for allowing installation of said one support means on said valve plate from external of and through one support hole in said duct but thereafter retaining such bearing portion in said one support hole to thereby retain both said lever and valve plate in place with said lever external of said duct.

2. An air valve adapted for installation in an air duct of a vehicle air conditioning, heating and defrosting system and the like characterized by a valve plate and a pivotal support and lever arrangement therefor comprising two lever-bearing members each having a pair of fingers at one end adapted to straddle said valve plate at opposite ends thereof, each said member further having an integral bearing portion, said bearing portions adapted to be received in aligned support holes in said duct to thereby support said valve plate for pivotal movement therein, said valve plate and the fingers of both said members having cooperating detent means for locking said members on said valve plate so that said bearing portions are in axial alignment, both said members further having a lever joined to the other end thereof, and snap-in means on each said member intermediate its bearing portion and fingers for allowing installation thereof on said valve plate from external of and through its support hole in said duct but thereafter retaining such bearing portion in place and thereby said valve plate in place with such lever external of said duct.

3. An air valve adapted for installation in an air duct of a vehicle air conditioning, heating and defrosting system and the like characterized by a valve plate and a pivotal support and lever arrangement therefor comprising two support members each having a pair of integral fingers at one end adapted to straddle said valve plate at opposite ends thereof, each said support member further having an integral bearing portion, said bearing portions adapted to be received in aligned support holes in said duct to thereby support said valve plate for pivotal movement therein, said valve plate and the fingers of said support members having cooperating detent means integral therewith for locking said support members on said valve plate so that said bearing portions are in axial alignment, at least one of said support members further having a lever integrally joined to the other end thereof, and snap-in means integral with said one support member intermediate its bearing portion and fingers for allowing installation of said one support member on said valve plate from external of and through one support hole in said duct but thereafter retaining such bearing portion in said one support hole to thereby retain both said lever and valve plate in place with said lever external of said duct.

4. An air valve adapted for installation in an air duct of a vehicle air conditioning, heating and defrosting system and the like characterized by a valve plate and a pivotal support and lever arrangement therefor comprising two separate support means each having a pair of fingers adapted to straddle said valve plate at opposite ends thereof, each said support means further having a bearing portion, said bearing portions adapted to be received in aligned support holes in said duct to thereby support said valve plate for pivotal movement therein, said valve plate and the fingers of both said support means having cooperating detent means for locking said support means on said valve plate so that said bearing portions are in axial alignment, and snap-in means on at least one of said support means intermediate its bearing portion and fingers for allowing installation of said one support means on said valve plate from external of and through one support hole in said duct but thereafter retaining such bearing portion in said one support hole to thereby retain said valve plate in place in said duct.

* * * * *